United States Patent
Chu (10) Patent No.: US 11,753,931 B2
(45) Date of Patent: Sep. 12, 2023

(54) TOOL STRING FAILURE CONTROL IN A BOTTOM HOLE ASSEMBLY

(71) Applicant: Halliburton Energy Services, Inc., Houston, TX (US)

(72) Inventor: Jianying Chu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 374 days.

(21) Appl. No.: 16/019,731

(22) Filed: Jun. 27, 2018

(65) Prior Publication Data
US 2020/0003047 A1    Jan. 2, 2020

(51) Int. Cl.
  *E21B 47/13*    (2012.01)
  *H04L 12/40*    (2006.01)
  *E21B 47/18*    (2012.01)

(52) U.S. Cl.
  CPC .............. *E21B 47/13* (2020.05); *H04L 12/40* (2013.01); *E21B 47/18* (2013.01)

(58) Field of Classification Search
  CPC ......... E21B 47/122; E21B 47/18; H04L 12/40
  See application file for complete search history.

(56) References Cited

U.S. PATENT DOCUMENTS

| 2002/0104661 A1* | 8/2002 | Head ...................... E21B 23/14 |
| | | 166/380 |
| 2006/0117113 A1* | 6/2006 | Elliott ...................... H04L 1/22 |
| | | 709/239 |
| 2016/0091628 A1* | 3/2016 | Reagor ..................... G01V 3/28 |
| | | 324/339 |
| 2016/0115766 A1* | 4/2016 | Tosi ...................... E21B 43/128 |
| | | 166/373 |
| 2016/0215612 A1* | 7/2016 | Morrow .................. E21B 47/01 |
| 2017/0331280 A1* | 11/2017 | Koenecke ................ H02H 7/20 |
| 2018/0058198 A1* | 3/2018 | Ertas ....................... E21B 47/12 |
| 2019/0128113 A1* | 5/2019 | Ross ....................... E21B 47/06 |

\* cited by examiner

*Primary Examiner* — Omer S Khan
(74) *Attorney, Agent, or Firm* — DELIZIO, PEACOCK, LEWIN & GUERRA (57) ABSTRACT

A system for remediating a bus sectioning events, such as a bus failure or controlled sectioning, comprises a plurality of nodes coupled together by a bus in a tool string used in a bottom hole assembly (BHA). Each node comprises a bus switch configured to isolate the node from a section of the bus. Upon a bus sectioning event, a first sub-tool string and a second sub-tool string are created on either side of the bus section to be isolated, each of which independently operate in parallel. Communication between the first and second sub-tool buses is established through respective nodes connected to each sub-tool bus that comprise a wireless communication transceiver configured to convey signals along the tool string. Alternatively or additionally, each of the sub-tool buses has a node with telemetry for communicating with the surface. Accordingly, each of the sub-tool busses continues independently operating normally.

5 Claims, 6 Drawing Sheets

TOOL STRING FAILURE CONTROL IN A BOTTOM HOLE ASSEMBLY

FIELD OF THE INVENTION

The present disclosure relates to the tool string failure control in a bottom hole assembly (BHA) which may be conveyed downhole with a drill string, a coil tube, a slickline, a wireline, etc. More specially, the failure control includes failure detection, failure diagnosis, failure isolation, failure remediation while the tool string remains downhole.

BACKGROUND

Electronics are increasingly used for testing, control, measurement, actuation, and communication in downhole (i.e., in a wellbore) applications, such as measurement while drilling/logging while drilling (MWD/LWD) and directional drilling (or geosteering), wireline logging, coil tubing, slickline services, and the like.

Downhole environments are harsh. Accordingly, downhole electronics are enclosed in protective packages against high pressure, conductive fluids, corrosive chemicals, etc., that are in excess of electronics designed specifications. A BHA includes a plurality of these protective packages (i.e., segments) connected end-to-end at segment joints. Typically, the segments are constructed from high-strength metal or metal alloys and have a tubular form to allow the BHA to be easily moved through a borehole regardless of the trajectory of the borehole. In practice, a segment is typically a drill collar, a drill sub, a pressure mandrel and the like.

A bus is used to electrically connect the segments together to form a network allowing the electronics in each segment to share data and electrical power. The bus network employs one or a few common electrical paths passing through each segment, traversing the joints of adjacent segments, and terminated at each end.

Downhole electronics are usually grouped into various tools, each of which performs a particular function (e.g., formation testing and measurements, drillstring monitoring, geosteering, etc.). The tools may tap into the bus (i.e., tool bus) as communicating nodes to exchange data and/or power. A group of tools exchanging power and data via a bus are referred to collectively as a tool string (i.e., tool bus network).

In most cases, the tool string is further linked to the surface for real time data communication and/or power transmission via telemetry. Typically, the telemetry may employ mud pulse, acoustic wave, electromagnetic wave, wired-pipes, continuous conductors (wire line, coil tubing, slickline, etc.) or a combination thereof.

A tool string is prone to the single point of failure. That is, a single failure in the bus or the connected tool may disable the whole tool string. As the common electrical path(s) of the bus are shared by all tools, any single bus failure may disable the bus communication and collapse the tool string as the required tool collaboration is disrupted. Consequently, it is typically necessary to remove the tool string from downhole, which is time consuming and costly. Additionally, failures may also arise from the connected tools, which may propagate to the bus and disrupt the bus communication as well.

Root cause analysis (RCA) of the failure in the tool string is inherently difficult. Because communication over a failed bus is disabled, it necessitates removal of the failed tool string from the downhole, which undesirably change the stress profile on the failed tool string and potentially removes evidence of the failure. Given that it is impractical to simulate the downhole conditions at the surface, stress-activated failures are extremely difficult to diagnose.

Generally, a failure (i.e., fault) in a tool string can be disruptive, costly, and can lead to unwelcomed outcomes. For example, the time spent on the removal of tool string is non-productive time (NPT) and cause the operation loss. Accordingly, a lengthy repair process and its excessive cost can lead to a negative customer response. In addition, the adoption and/or validation of new tools can be significantly hindered by the time/cost of such failures.

SUMMARY

According to a first aspect of the disclosure, a method is provided for remediating a bus sectioning event of a bus in a tool string used in a bottom hole assembly (BHA). The method comprises isolating a bus section with the sectioning event by disconnecting the bus section at a first node of the tool string from a first side of the bus section and disconnecting the bus section at a second node of the tool string from a second side of the bus section. Isolating the bus section creates a first sub-bus on the first side comprising the first node and a second sub-bus on the second side comprising the second node. The method also comprises wirelessly communicating bus signals between the first sub-bus and the second sub-bus.

In some implementations of the first aspect of the disclosure, the bus sectioning event is in response to a bus failure in the bus section or a command to create the first sub-bus and the second sub-bus.

In some implementations of the first aspect of the disclosure, the first sub-bus has a first signal transceiver linked to a third node of the first sub-bus to communicate the bus signals with a second signal transceiver linked to a fourth node of the second sub-bus.

In some implementations of the first aspect of the disclosure, the third node is an endpoint node of the first sub-bus farthest from the bus section and the fourth node is an endpoint node of the second sub-bus farthest from the bust section.

In some implementations of the first aspect of the disclosure, the first signal transceiver or the second signal transceiver comprise an array of transceiver components.

In some implementations of the first aspect of the disclosure, the array of transceiver components comprise one or more signal transmitter components and one or more signal receiver components.

In some implementations of the first aspect of the disclosure, the first signal transceiver or the second signal transceiver comprise an antenna configured to transmit and/or receive electromagnetic (EM) waves.

In some implementations of the first aspect of the disclosure, the antenna is placed around an outer perimeter of a segment in the BHA.

In some implementations of the first aspect of the disclosure, the antenna is placed within an inner bore of a segment in the BHA.

In some implementations of the first aspect of the disclosure, the first signal transceiver or the second signal transceiver is configured to transmit and/or receive acoustic waves.

In some implementations of the first aspect of the disclosure, the acoustic waves propagate through a body of segments in the BHA.

In some implementations of the first aspect of the disclosure, the first signal transceiver or the second signal transceiver is magnetostrictive, piezoelectric or a combination thereof.

In some implementations of the first aspect of the disclosure, the first signal transceiver or the second signal transceiver comprises an electrode or an array of electrodes configured to transmit and/or receive electric charges.

In some implementations of the first aspect of the disclosure, the electric charges propagate through an annulus and a formation surrounding the BHA.

In some implementations of the first aspect of the disclosure, the first sub-bus maintains communication with a surface communicating device via a telemetry, and the second sub-bus maintains communication with the surface communicating device through the first sub-bus via the wireless communication signals.

In some implementations of the first aspect of the disclosure, the telemetry is one of mud pulse, acoustic wave, electromagnetic wave, wired-pipes, continuous conduct, or a combination thereof.

In some implementations of the first aspect of the disclosure, wirelessly communicating the bus signals occurs in response to the first sub-bus and the second sub-bus being created due the bus sectioning event, and wherein wirelessly communicating the bus signals is stopped during normal operation.

In some implementations of the first aspect of the disclosure, wirelessly communicating the bus signals occurs periodically during normal operation to tune a communication channel to current downhole conditions.

According to a second aspect of the disclosure, a method for remediating a bus sectioning event of a bus in a tool string used in a bottom hole assembly (BHA). The method comprises isolating a bus section with the sectioning event by disconnecting the bus section at a first node of the tool string from a first side of the bus section and disconnecting the bus section at a second node of the tool string from a second side of the bus section. Isolating the bus section creates a first sub-bus on the first side comprising the first node and a second sub-bus on the second side comprising the second node. The method also comprises communicating the first sub-bus to the surface with a first telemetry. The method also comprises communicating the second sub-bus to the surface with a second telemetry.

In some implementations of the second aspect of the disclosure, the first telemetry operates and the second telemetry is not used in normal operations without the sectioning event.

According to a third aspect of the disclosure, a method for remediating a bus failure of a bus in a tool string is used in a bottom hole assembly (BHA). The method comprises isolating the bus failure by disconnecting the bus at a first node of the tool string from a first side of a section of the bus with the bus failure and disconnecting the bus at a second node of the tool string from a second side of the section of the bus with the bus failure. The method also comprises wirelessly communicating bus signals within a bore of the tool string between a third node on the first side and a fourth node on the second side, wherein the third node communicates the bus signals with an antenna located within the inner bore of a first segment of the tool string.

In some implementations of the third aspect of the disclosure, isolating the bus failure creates a first sub-bus on the first side and a second sub-bus on the second side.

In some implementations of the third aspect of the disclosure, the fourth node communicates the bus signals with a second antenna located within the inner bore of a second segment of the tool string.

In some implementations of the third aspect of the disclosure, the third node is an endpoint node farthest from the section of the bus.

In some implementations of the third aspect of the disclosure, the third node is an intermediate node on the first side.

In some implementations of the third aspect of the disclosure, a master node on the first side maintains communication with a surface computer via a first telemetry.

In some implementations of the third aspect of the disclosure, a master node on the second side maintains communication with the surface computer via the bus signals within the bore and the master node on the first side.

In some implementations of the third aspect of the disclosure, a master node on the second side maintains communication with a second surface computer via a second telemetry.

In some implementations of the third aspect of the disclosure, the second telemetry is different than the first telemetry.

In some implementations of the third aspect of the disclosure, the first telemetry is one of mud pulse, acoustic wave, electromagnetic wave, wired-pipes, and/or continuous conductor.

According to a fourth aspect of the disclosure, a system comprises a plurality of nodes coupled together by a bus in a tool string used in a bottom hole assembly (BHA). The bus is configured to convey power and/or data among the plurality of nodes. Each of the plurality of nodes comprise a bus switch configured to connect a respective node to a section of the bus. The bus switch is configured to disconnect the respective node from the section of the bus upon a failure in the section of the bus. A first of the plurality of nodes is coupled to a wireless communication transceiver located within an inner bore of a segment of the tool string, wherein the first node is configured to communicate signals conveyed within the inner bore.

In some implementations of the fourth aspect of the disclosure, the wireless communication transceiver is configured to communicate with electromagnetic (EM) waves, acoustic waves, and/or current injection.

In some implementations of the fourth aspect of the disclosure, the wireless communication transceiver is an antenna located within the inner bore of the segment of the tool string.

In some implementations of the fourth aspect of the disclosure, a second of the plurality of nodes is coupled to a second wireless communication transceiver located within the inner bore of a second segment of the tool string, wherein the second node is configured to communicate signals conveyed within the inner bore.

In some implementations of the fourth aspect of the disclosure, the wireless communication transceiver is configured to operate in a powered down mode during normal operation and configured to establish wireless communication across two independently operating sub-tool strings in the event of a bus failure.

In some implementations of the fourth aspect of the disclosure, the wireless communication transceiver is configured to be periodically powered in the powered down mode to tune a communication channel to current downhole conditions.

According to a fifth aspect of the disclosure, a system comprises a plurality of nodes coupled together by a bus in a tool string used in a bottom hole assembly (BHA). The bus is configured to convey power and/or data among the plurality of nodes. Each of the plurality of nodes comprise a bus switch configured to connect a respective node to a section of the bus. The bus switch is configured to disconnect the respective node from the section of the bus upon a failure in the section of the bus. A first of the plurality of nodes is configured to communicate with a surface computer via a first telemetry. A second of the plurality of nodes is configured to communicate with a second surface computer via a second telemetry.

In some implementations of the fifth aspect of the disclosure, the first telemetry is different from the second telemetry.

In some implementations of the fifth aspect of the disclosure, the first node is an endpoint node on one end of the bus and the second node is an endpoint node on the other end of the bus.

In some implementations of the fifth aspect of the disclosure, the first node is an intermediate node on the bus.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Some terminology used in the present disclosure may be typically defined as follows. A "tool" is a functional unit which may include electronics, sensors, and other components to execute particular functions. A tool may contain "tool electronics" that perform the tool-specific functions. A "tool bus" (i.e., bus) is a common communication channel over which data and power can be exchanged, that is terminated at each distal end (i.e., endpoint). A "tool string" (i.e., tool string) is a group of tools connected to a common tool bus for the exchange of data and power. A "segment" is a structural unit, which has sealed cavities to accommodate electronics, and which typically has a tubular form. A "bottom hole assembly" (BHA) is a group of segments that are connected end to end that have tools installed inside. A tool may be contained within one segment, multiple segments (e.g., adjacent segments, interleaved segments), or may share a segment with one or more other tools. A "node" is a functional unit that has only one access point to the tool bus, while a tool may have none, one, or multiple access points to the tool bus. Depending on the complexity of a tool, a tool may include one or multiple nodes. Additionally, multiple tools maybe integrated into one node. For simplicity, in the description that follows, a tool is described with only one node and therefore the term "tool" may be used interchangeably with "node." This configuration is not intended to be limiting to the scope of the disclosure because, as mentioned above, the tool/node configuration may vary in practice. Additionally, the term "tool" is further used to specifically refer to the node backend electronics after the tool switch. However, it should be understood that this use does not imply any limitations of the principles and methods disclosed herein because tools may be embodied variously.

The pending application discloses a method of tool string failure control in a BHA. The method includes failure detection, failure diagnosis, failure isolation, and bus failure remediation while the tool string remains downhole. For illustrative purpose, a drillstring BHA which is used for downhole drilling is described in the examples herein. However, the BHA may be used in other applicable situations including but not limited to, wireline, slickline, coil tubing, production logging, etc.

Drillstring Bottom Hole Assembly (BHA)

Figure 1:
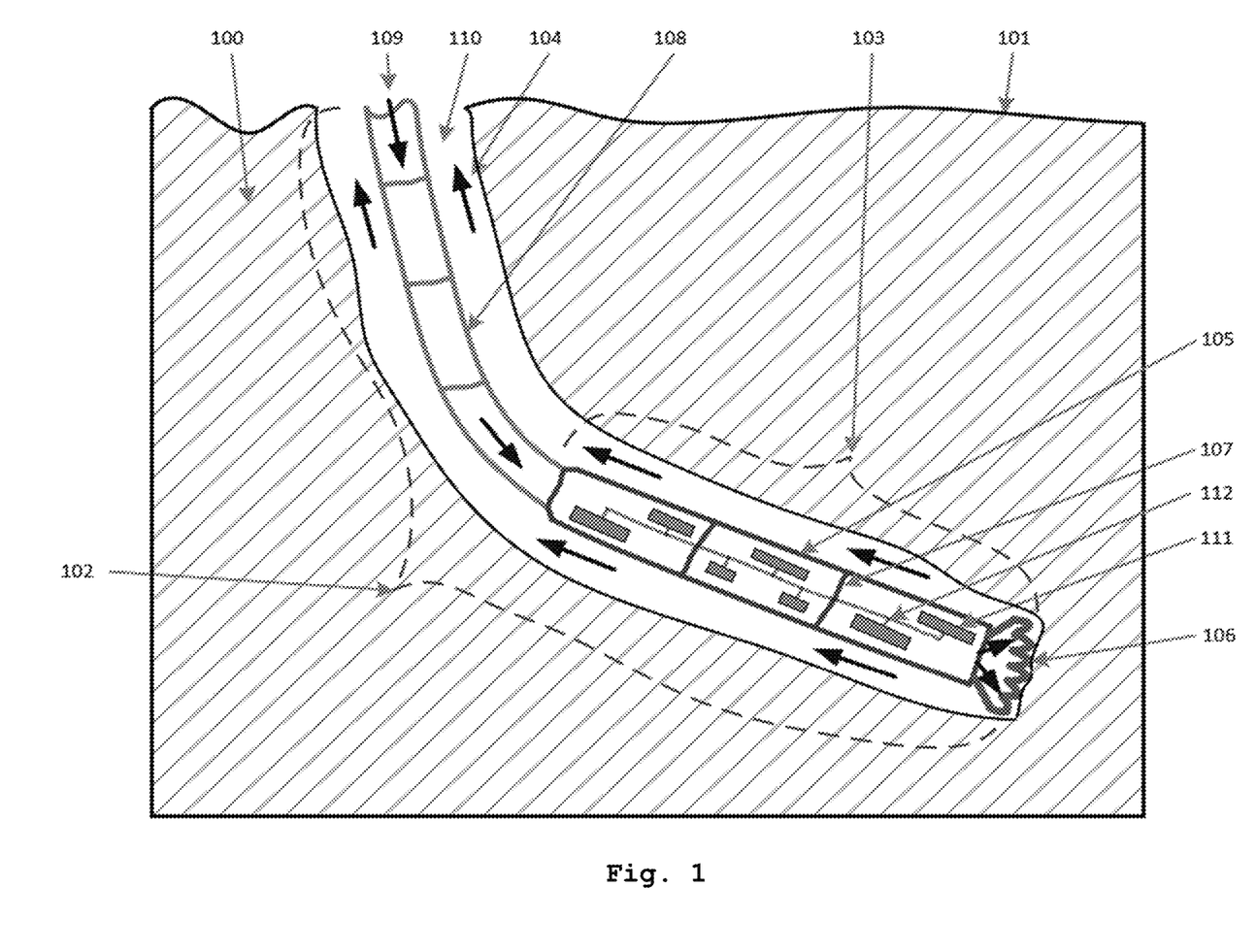
FIG. 1 is a schematic diagram of a partial drillstring with a BHA in a wellbore suitable for implementing the disclosed embodiments.

FIG. 1 is a schematic diagram of a partial drillstring 102 with a BHA in a wellbore suitable for implementing the disclosed embodiments. The drillstring 102 is used to penetrate a formation 100 and create a borehole connecting a targeted reservoir to the surface 101. The drillstring 102 is made up of an assembly of serially-connected drill pipes 108 at its upper section and a BHA 103 at its lower section. The BHA 103 includes serval segments 105 of drill collars or functional drill subs connected end-to-end with rotatory shouldered joints 107, and a drill bit 106 disposed at its lower distal end. Various tools 111 like a density tool, porosity tool, MRIL tool, telemetry tool, and geosteering tool may be enclosed in the BHA segments 105. A tool bus 112 is used to network the tools 111 for data and power transmission. Usually, a telemetry tool is used to further link the tool bus 112 to the surface for real-time data communication and power transmission. The drillstring 102 has an inner bore 109 to circulate drill mud 104 from the surface 101 down to the nozzles (not shown) of the drill bit 106, then circulate up through the annulus 110 between the drillstring and the borehole, and finally back to a mud pit (not shown) on the surface 101.

Downhole drilling has harsh environments and operating conditions. Especially at the segment joints 107, high mechanical stresses inclusive of axial weight, rotating torque, bending moment, vibratory shock, etc. are sustained. Joint failures are not uncommon and may manifest as a tool bus short, broken connection, or intermittent contact, which are catastrophic to operations and necessitate the removal of the drillstring 102 from downhole.

Conventional Tool String

Figure 2:
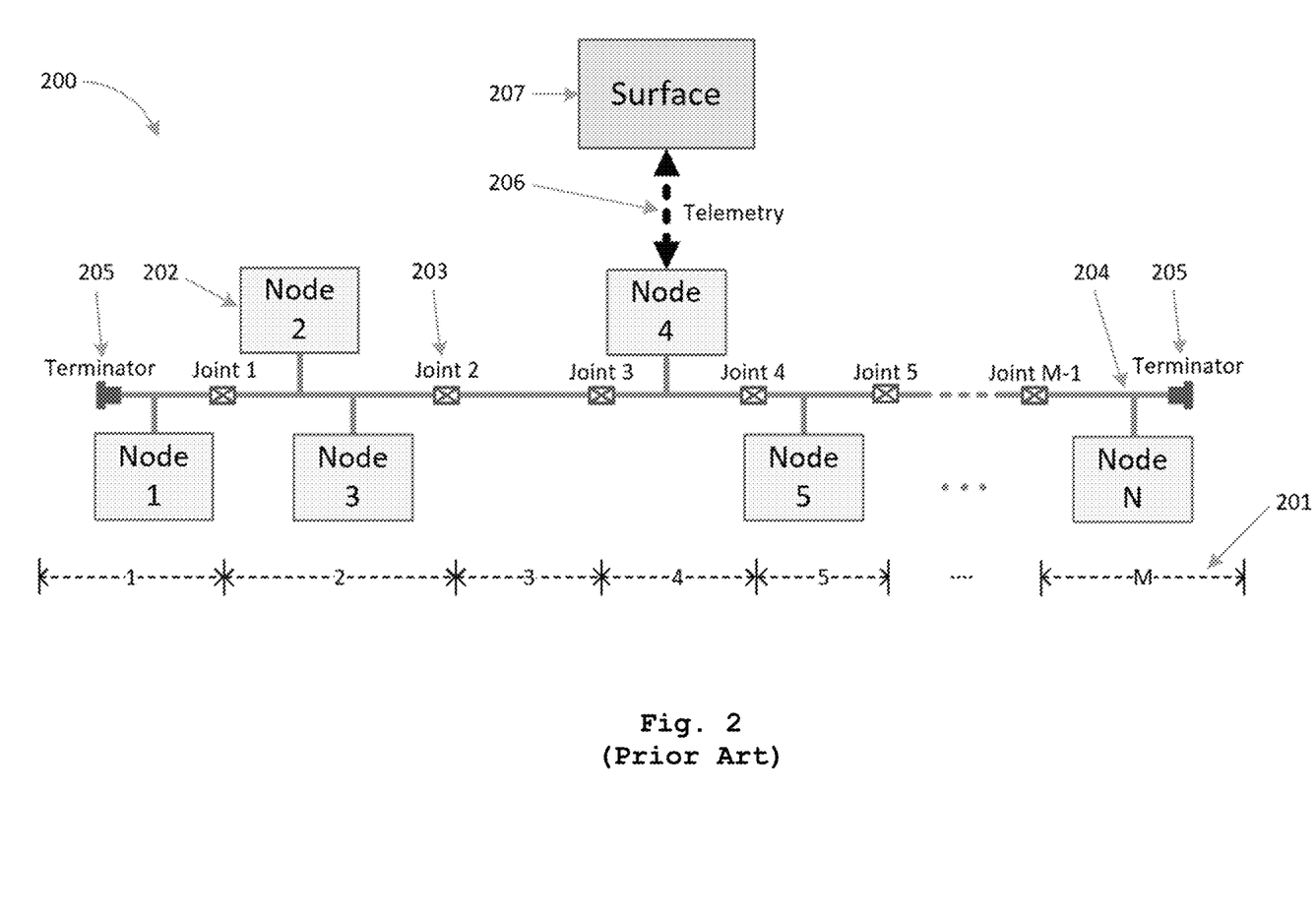
FIG. 2 is a schematic diagram of a conventional tool string for a BHA in accordance with current industry practice.

FIG. 2 is a schematic diagram of a conventional tool string for a BHA in accordance with current industry practice. For ease in illustrating the principles and methods of the present disclosure, FIG. 2 illustrates an embodiment in which both power (i.e., bus power, power signal, etc.) and data (i.e., bus data, data signal, etc.) are transmitted together on a common electrical path (i.e., bus). It should be understood that the principles and methods disclosed herein might be used for embodiments in which power and data are transmitted separately through two (or multiple) common electrical paths.

A tool string 200 is enclosed in M segments 201 that are connected end-to-end at M−1 joints 203. A tool bus 204 traverses the joints 203 and extends to two distal endpoints at which terminators 205 are installed to prevent signal reflections. The tool bus 204 has N nodes 202 connected which are placed in the M segments 201. Typically, N is 2~16 and M is 2~8.

It is typical for at least one node 202 to communicate with the surface 207 through a telemetry 206. For example, as shown in FIG. 1, Node 4 communicates to equipment located at the surface 207 of a wellbore using the telemetry 206. Accordingly, Node 4 performs all necessary protocol translation and power conversion between the two systems. The telemetry 206 is a point-to-point communication for real-time data and/or power transmission between the downhole tool string 200 and the surface 207. Various types of telemetry may be used, such as mud pulse, wired-pipe, continuous cable, electromagnetic (EM) wave, acoustic wave, or a combination thereof.

As shown in FIG. 1, all nodes 202 are connected to one common path (i.e., the bus 204), which makes the system vulnerable to failure. A failure can manifest as short circuit or open circuit and may arise within any connected node 202 or along the bus 204. Usually, failures along the bus 204 are catastrophic and can disable the tool string 200 and necessitate the removal of it from downhole. Failures within a node 202 may be self-enclosed or propagate along the bus 204. A self-enclosed failure is benign and limited to the node itself and doesn't disrupt the bus 204 and leaves the rest of the tool string 200 still functional. A downhole job may continue when the functions of the failed node are not imperative. By the contrast, a propagating failure not only affects the node 202 itself, but also disrupts the bus communication if not isolated, e.g., short circuit of power supply. Propagating failures are not uncommon, and may manifest as short AC and/or DC circuit, loss of a terminator, unintended bus access, etc. It is highly desirable to eliminate the propagation of failures to the bus 204.

Failure-Tolerant Tool String

Figure 3:
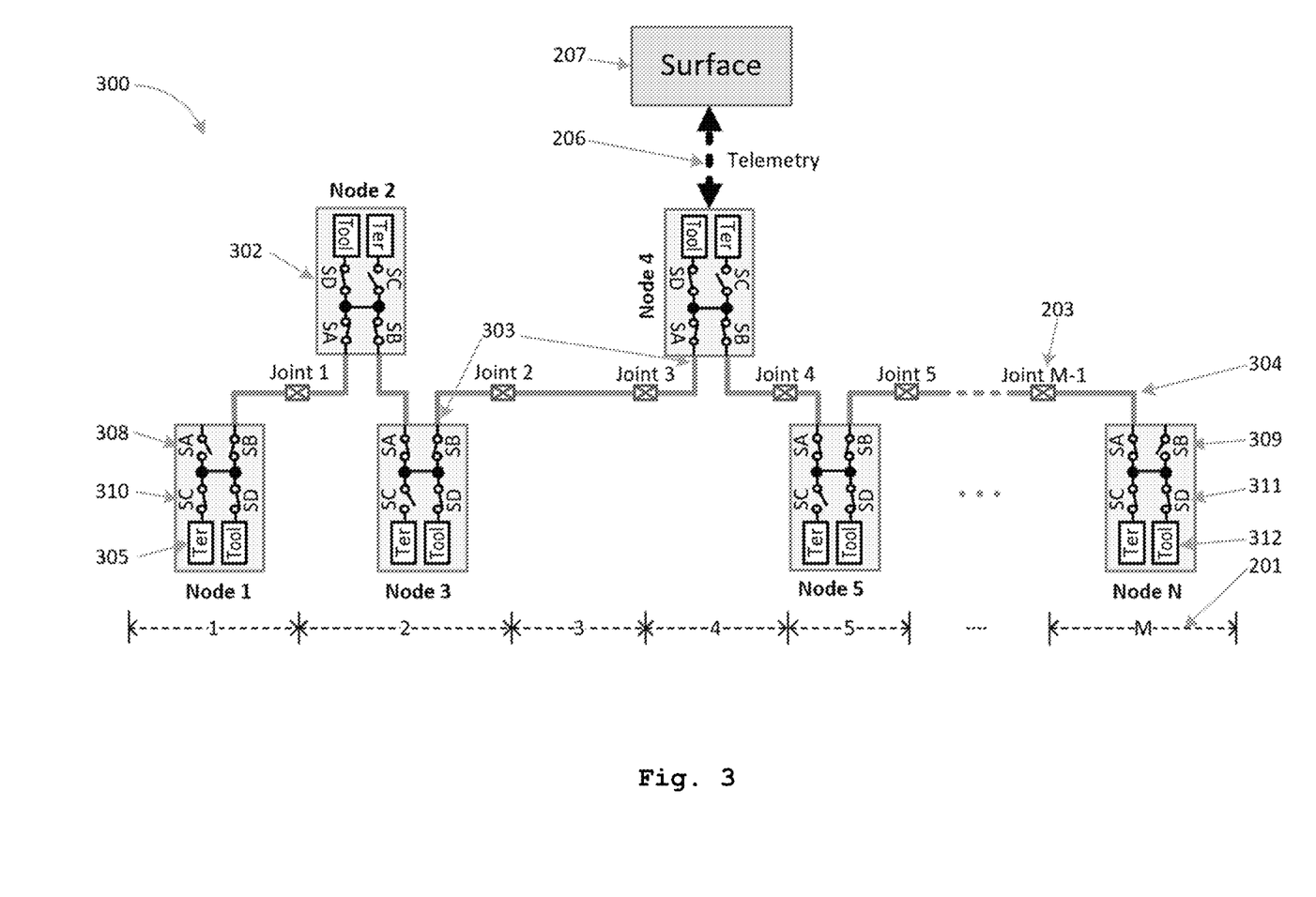
FIG. 3 is a schematic diagram of a failure-tolerant tool string for a BHA in accordance with an exemplary embodiment of the present disclosure.

FIG. 3 is a schematic diagram of a failure-tolerant tool string for a BHA in accordance with an exemplary embodiment of the present disclosure. The fault-tolerant tool string may be implemented as described in application Ser. No. 15/893,225, entitled "Reconfigurable Tool Bus Network For A Bottom Hole Assembly," filed on Feb. 9, 2018 and application Ser. No. 15/902,328, entitled "Intelligent Tool Bus Network For A Bottom Hole Assembly," filed on Feb. 22, 2018, both of which are hereby incorporated by reference in their entirety.

As in the conventional embodiment described in the FIG. 2, a tool string 300 is enclosed in M segments 201 connected end-to-end and N nodes 302 are distributively placed in the segments. A tool bus 304 includes N−1 sections 303 that are joined together through the N nodes 302. Each section 303 is the electrical path between two adjacent nodes 302.

Each node 302 includes a first bus switch (SA) 308 and a second bus switch (SB) 309 that are connected in series and that are each electronically configurable in an open/closed position. SA 308 and SB 309 are arranged in series with bus sections 303 and with each other. The states of SA 308 and SB 309 determines whether transmission of signals passes through the node 302 and along the bus 304. For example, bus signals may pass through the node when both SA 308 and SB 309 are in a closed position.

Each node 302 also includes a terminator switch (SC) 310 electrically connected to a point between SA 308 and SB 309 and a terminator 305 (e.g., contained in the node) and that is electronically configurable in an open/closed position. SC 310 in a node can be used to terminate the bus 304 when closed to prevent reflections on the bus 304. From the electrical perspective, SC 310 and the terminator 305 are connected in series between the bus 304 and the bus return (not shown in FIG. 3). Hence, their positions may be swapped and still have the same function. That is, the terminator 305 may be connected to a point between SA 308 and SB 309 and the terminator switch SC 310.

Each node 302 also includes a tool switch (SD) 311 connected electrically to a point between SA 308 and SB 309, and the tool 312 and that is electronically configurable in an open/closed position. SD 311 attaches/detaches the tool 312 to/from the bus 304 when it is closed/opened.

The four switches may be solid-state such as thyristors, BJTs, FETs or IGBTs, or electro-mechanical such as relays. FETs, especially MOSFET are preferred for performance and reliability in downhole environments. A MOSFET has a fast switching speed and is a voltage-control device with a low drive requirement, which can be turned on/off by changing the voltage level of control input, i.e., High or Low.

The state of the four switches (i.e., SA 308, SB 309, SC 310, and SD 311) in each node 302 are controlled by a local controller. SC 310 closes if one of SA 308 or SB 309 is open, and SC 310 opens if both SA 308 and SB 309 are closed. For example, if SA 308 is closed and SB 309 is open then SC 310 is closed. As shown in FIG. 3, Node 1 and Node N are located at the two endpoints of the bus 304. Accordingly, each endpoint node has one closed bus switch (i.e., SB 309 in the Node 1 and SA 308 in the Node N, respectively) and a closed SC 310.

Each node 302 also include the tool 312 which includes one or more tools, which is controllably connected to the bus 304 via SD 311. The tool 312 forms the major part of a node 302. In fact, the tool 312 typically implements complex functions and vary largely from one node to others, which predicts high failure occurrences and is also the major failure source. By the contrast, the rest of the node 302 comprise simple components and functions and may preferably have a standardized implementation for all nodes 302. By modern electronic quality control, high reliability with little failure is achievable for a standardized implementation. Hence, node failure and tool failure may be interchangeably used in the following descriptions.

The tool 312 of an intermediate node 302 which is located along the bus (i.e., Node 2 to N−1) may be attached/detached to/from the bus 304 directly by closing/opening SD 311. As shown in FIG. 3, each intermediate node has closed SA 308 and closed SB 309 so that the node 302 passes bus signals (e.g., power and/or data), closed SD 311 so that the tool 312 connected to the bus 304, and opened SC 310 so that the intermediate node avoids improper termination to the bus 304.

The tool 312 of an endpoint node 302 which is located at an endpoint of the bus (i.e., Node 1 or N) may be attached/detached to/from the bus 304 indirectly by closing/opening a bus switch (i.e., SA 308 or SB 309) of an immediately adjacent intermediate node (i.e., Node 2 or N−1). As shown in FIG. 3, endpoint nodes (i.e., Node 1 and N) each has one closed bus switch (i.e., SB 309 in Node 1 and SA 308 in Node N) and one opened bus switch (i.e., SA 308 in Node 1 and SB 309 in Node N), and closed SD 311 so that the tool 312 connected to the node 302 is attached to the bus 304. Closed SC 310 of both endpoint nodes (i.e., Node 1 and N) ensures proper termination to the bus 304. For example, to detach Node 1 from the bus 304 and make Node 2 the endpoint, SA 308 of Node 2 is opened. The opening of SA 308 causes the SC 310 of Node 2 to close, thereby terminating the bus 304 properly.

One or more nodes 302 may be selected to communicate with the surface 207 via their own telemetry 206. As shown in FIG. 3, Node 4 is selected to communicate to the surface 207 via the telemetry 206.

Unlike the conventional embodiment described previously, each node 302 includes switches that make the tool string 300 tolerant to failures and keep the tool string operation continuing without being removed from downhole. The tool string is tolerant to failures in the bus 304 because each bus section 303 can be disconnected from the tool string to isolate detected failure sites by turning off the bus switches of two adjacent nodes. For example, Nodes 4 and Node 5 may turn off their SB 309 and SA 308 respectively to isolate a failure at Joint 4. The tool string is also immune to failures of the tool 312 in a node 302 because each node 302 can open its SD 311 in event of a failure to break away from the bus 304 and prevent the failure from propagating along the tool string 300.

Self-Isolation of Failed Node

A failure in the tool 312 can be isolated from the bus 304 by opening SD 311 and disconnecting the tool 312 from the bus 304. SC 310 is also opened to disconnect the terminator 305 from the bus 304 to avoid improper termination to the bus 304, and SA 308 and SB 309 are closed to freely pass the bus signal so that the rest of the tool string continues operating normally. Therefore, two bus sections 303 connecting to a failed intermediate node (i.e., Node 2 to N−1 in the FIG. 3) join together as a single bus section 303, so the removal of the failed node has no impact on the rest of the tool string. If a failure in the tool 312 occurs in an endpoint node (i.e., Node 1 or N), the next adjacent node (i.e., Node 2 or N−1) can open its bus switch (SA 308 or SB 309 depending on which end) connecting to the failed endpoint node to remove the failed endpoint node from the tool string while closing its terminator switch SC 310 to properly terminate the bus 304.

A self-diagnostic program running in a node is used to detect a node failure. However, the self-diagnostic program may be disabled from running by undetected failures which may be either be self-enclosed or propagating. The self-diagnostic program is preferably executed in an MCU (main controller unit) in the tool 312. The MCU comprises digital circuits, especially integrated circuits (IC) and is typically a processor, a DSP, a microcontroller, an FPGA, an ASIC, etc. or a combination thereof. In practice, the four switches are also preferably controlled by the MCU for a simple tool implementation. However, when the MCU doesn't run due to a failure or loss of power supply, the expected control over four switches may not be guaranteed if no special measures are taken because the MCU may output uncertain states for the switch control as a result of the failure.

Consequently, the four switches may not assume required states (i.e., SA 308 and SB 309 are closed, SC 310 and SD 311 are opened) in response to a failure. To achieve the expected states of four switches in any event, the control inputs to four switches may be generated with secured control lines as described in application Ser. No. 15/893,225, entitled "Reconfigurable Tool Bus Network For A Bottom Hole Assembly," filed by the same applicant on Feb. 9, 2018, which is hereby incorporated by reference in its entirety.

A secured control line has two states, a default state and a secured state. Either the secured state or the default state may be issued when a tool is operating properly, while only the default state is issued if a failure occurs. The two states are then mapped to two control states for a switch (i.e., High or Low). For example, a secured-low control line can have a low voltage as its secured state and a high voltage as its default state. Likewise, a secured-high control line can have a high voltage as its secured state and a low voltage as its default state.

The MCU is usually made of digital circuits. The discrete nature of digital circuit makes the MCU inherently resist oscillating even when a failure occurs in the MCU. The MCU usually outputs stable electrical states (i.e., DC) rather than oscillating states (i.e., AC) in the event of a failure or loss of power, although the voltage levels of the DC states are uncertain, low, high or even intermediate. Therefore, the secured control line is structured such that upon receiving an AC signal, the secured control line generates the secured state. Likewise, the secured control line is structured such that upon receiving a DC signal or lack of an AC signal, the secured control line generates the default state.

In an exemplary process to generate the definite control over the four switches in response to a failure, the MCU ceases an AC-like pulse train that, if otherwise available, is converted by an electrical circuit of the secured control line into a required secured state (i.e., low or high), and the electrical circuit of the secured control line issues the default state upon the pulse train ceasing. That is, when the pulse train is not received, the electrical circuit will output the state opposite to the secured state—the default state.

In some cases, a tool may be configured (e.g., by software or command received from the tool bus) to issue a request to the MCU that is related to its connection to the bus. For example, the MCU may receive a request to remove the tool from the bus. This request may be treated as the detection of a failure. Accordingly, if a request for a tool to be disconnected is received, the MCU stops pulsing. As a result, the tool switch SD 311 will open and disconnect the tool 312 from the bus 304.

Failure Control of Failure-Tolerant Tool String

Media access control (MAC) to the tool bus 304 prevents bus access conflicts from nodes 302 that use a common electrical path. For clear description, time domain multiplexing (TDM) and a bus mastering scheme are used for illustration given their popularity in the industry. Certainly, other multiplexing schemes such as frequency division multiplexing, code division multiplexing, etc., and other TDM channel access methods including token passing schemes, etc. may be used without departing from the spirit and scope of the disclosure.

Figure 4:
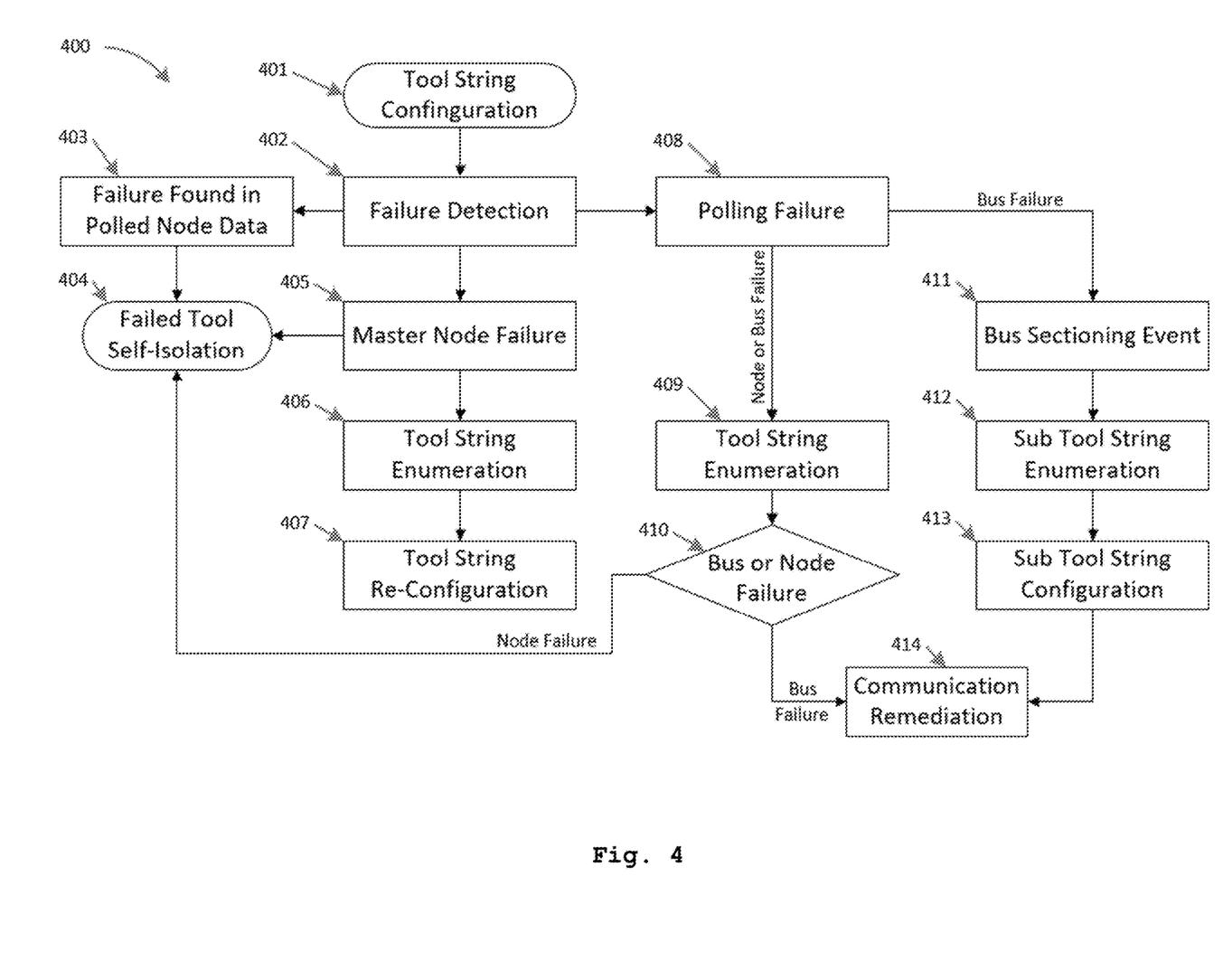
FIG. 4 is a flow chart illustrating a tool string failure control method for a failure-tolerant tool string.

FIG. 4 is a flow chart illustrating a tool string failure control method for a failure-tolerant tool string, such as the tool string 300. Using bus mastering, a master node controls the bus access from all connected nodes. Therefore, it is preferable for the master node to monitor all connected nodes to ensure the proper operation of the tool string, and to communicate critical information in real-time, especially failure-relevant data to the surface 207 via the telemetry 206 (e.g., Node 4 in the tool string 300).

In the flow chart, the control method 400 starts with a tool string configuration 401. In the configuration 401, the master node may collect node information such as identification, location, characteristics, requirements, failure interpretation methods, etc. and configure all nodes accordingly. String configuration 401 may include performing the enumeration process described in more detail below. The master node may synchronize important tool string information with other nodes and configure some selected nodes capable of functioning as a master node with emergency response plans in event of a failure. Thereafter, the tool string may enter into normal operation, and simultaneously failure detection also starts 402.

Failure detection 402 may include a node self-monitoring and a tool string polling. The node self-monitoring is a self-diagnostic program executed locally by each node to verify its proper operation. The implementation of the self-diagnostic program may be node-dependent, but usually includes to measure local health parameters (e.g., current consumption, voltage level, temperature rise, etc.,), to test the local functions (e.g., signal transmission and detection, circuit response, etc.), and to calibrate the sensitivity and resolution of local electronics as well as other testing routines. Preferably, the self-diagnostic program is repetitively executed by a main controller unit (MCU) in the tool 312 of a node 302 and its results may be recorded as tool logging for future use during failure troubleshooting and be communicated to the master node during the tool string polling (i.e., the polling).

The polling may be used by the master node to repetitively monitor the health of the bus and all nodes by their response to the polling. The interval between the polling may be fixed or varied. Preferably, the polling is fixed at an interval of several hundred milliseconds so that no intermittent failures are missed while at the same time not consuming too much bus bandwidth on the bus 304.

Failures may arise from one or more of the N−1 bus sections 303 of the bus 304 and/or from one or more of the N nodes 302 (or more particularly, the tool 312 of the node 302). Based on how a failure is detected by the master node, a failure is classified as: 1) a failure found in the polled node data; 2) a failure in the master node itself; or 3) a polling failure, i.e., when a node failed to respond to the polling.

In detection of a failure found in the polled node data 403, the master node may request the failed node to disconnect from the bus if communication to the failed node is still operational to prevent further escalation or propagation of the failure. Otherwise, the master node may wait for the self-isolation 404 of the failed node to disconnect from the bus when communication with the failed node is lost (e.g., the failed node disconnects the tool 312 by opening the tool switch SD 311). That is, self-isolation 404 of the failed node ensures the disconnection of a failed tool from the bus 304.

In event of a master node failure 405, the polling is ceased. The loss of the polling can trigger a tool string enumeration 406, through which a new node is re-elected as the master node. In the tool string enumeration 406, each node and each bus section are progressively powered on in sequence so that each of them can be tested separately to identify the site and nature of the failure. At the same time, the failed master node breaks away from the bus automatically by self-isolation 404 (e.g., the tool switch SD 311 of the failed maser node is opened). The newly elected master node may then re-configure the tool string in accordance to the emergency failure plan which is set in the original tool string configuration 401 and continues the downhole operation 407.

In detection of a polling failure 408, which results either from a failed node or a failed bus section, the master node may start a tool string enumeration 409 which is functionally the same to the enumeration 406 except for lack of the re-election of the master node. Thereafter, the master node checks at 410 whether the failure occurs in a bus section 303 or a node 302 in accordance to the diagnostic result from the enumeration 409. If the failure occurs in a node 302, i.e., the node failed to respond to the polling, the master node waits for the failed node to break away from the bus automatically by self-isolation 404 and then continues the downhole operation.

If the failure occurs in a bus section, communication across the failed bus section is blocked, which will trigger a bus sectioning event 411. A bus sectioning event 411 results in two separate tool string enumerations (i.e., 409 and 412) at both sides of the failed bus section, which will be described in detail in the later paragraphs. Enumeration 409 occurs in the sub-tool string that has the master node, and also terminates the sub-stool string at a node which connects to the failed bus section. Enumeration 412 is functionally the same to enumeration 406 and re-elects a new master node for a second sub-tool string which is terminated at a node which connects to the other side of the failed bus section. The newly elected master node may then re-configure the second sub-tool string in accordance with the emergency failure plan which is set in the original tool string configuration 401 and continues the downhole operation 413.

By isolating the failed bus section through two enumerations 409 and 412, the original tool string is sectioned at the failed bus section and leads to two sub-tool strings operating simultaneously in parallel. However, the communication of both signal and power between the two sub tool strings undesirably stops if no further action is taken.

While described above in the context of a bus failure, a bus sectioning event 411 may be triggered as part of an active control to divide a single unified tool string into multiple separate sub-tool strings. For example, the tool string may be sectioned into sub-tool strings by software to achieve higher bus speed over a shorter communication length, or to isolate a sub-tool string with noisy tools from others when sensitive measurements are made, or to selectively power off some intermediate tools to save their lifetime when their functions are not used, etc. Therefore, a bus sectioning event refers to any event which causes a single unified tool string to be sectioned into multiple isolated sub-tool strings.

Tool String Enumeration

Tool string enumeration is a process of detecting, identifying and diagnosing the nodes connected to and the failures existing in the tool string together with autonomous failure isolation and potential master re-election, which is described in application Ser. No. 15/902,328, entitled "Intelligent Tool Bus Network For A Bottom Hole Assembly," filed by the same applicant on Feb. 22, 2018, which is hereby incorporated by reference in its entirety.

When a node 302 is the current master node, it may initiate a tool string enumeration at any time, such as when detecting a failure in a node 302 or in the bus 304, or when receiving an enumeration command from other nodes or the surface 207 via the telemetry 206, etc.

When a node 302 capable of enumerating the tool string 300 is not the current master node, it may initiate a tool string enumeration if it has not received a polling request from the current master node for a predetermined period of time or it has detected the loss of bus power, which signals that there has been a failure in the current master node or in the bus.

A tool string enumeration may start with the four switches of all nodes 302 opened. The enumerating node, either the current master node or the node detecting the loss of polling, first closes its SD 311 and one of its bus switches, either SA 308 or SB 309 to power up a first bus section on a first side of the enumerating node. Meanwhile, the enumerating node closes its SC 310 to terminate the bus 304 at one end with its terminator 305.

A next node connecting to the newly-powered bus section keeps its four switches opened for a first period of delay upon detecting the power at the powered bus section. During the first period of delay, only the newly-powered bus section is powered so that the enumerating node can test the bus for any failures such as shortage or excessive leakage. If failures are detected, the enumerating node may request to turn off (e.g., open) the two bus switches connecting to the newly-powered bus section to isolate it, and then starts enumerating at a second side of the enumerating node, if the second side has not yet been enumerated.

If no failures are detected and after the first period of delay elapses, the next node turns on (e.g., closes) its bus switch (SA 308 or SB 309) that connects to the newly-powered bus section. The next node also turns on (e.g., closes) its tool switch SD 311 to connect itself to the bus 304. The next node also turns on (e.g., closes) its terminator switch SC 310 to terminate the bus 304 at the other end. Once the bus 304 is terminated at the both ends, bus communication may start. The next node keeps its other bus switch (the other bus switch of SA 308 or SB 309) open for the second period of delay so that no more bus sections are connected to the bus 304 during the second delay.

During the second period of delay, the enumerating node may run an AC impedance test for the number of terminators connecting the bus 304 and thereby determines whether the next node exists or not. If only one terminator is detected, i.e., no node is connecting to the newly-powered bus section, the enumerating node has completed the enumeration of the first side and can start enumerating at its second side. If two terminators are detected, i.e., the next node is connecting to the newly-powered bus section, the enumerating node can test the next node for any failures such as shortage, overcurrent, malfunctions, etc. Meanwhile, the next node starts running its self-diagnostic program as well. If failures exist in the next node and communication between the enumerating node and the next node is good, the enumerating node may request the next node to disconnect from the bus 304 by opening the next node opening its tool switch SD 311. Otherwise, if communication between the enumerating node and the next node is not good, the enumerating node waits for the second delay to expire. At the end of the second delay, the failed next node will automatically break away from the bus 304 by self-isolation as described earlier and also power on the next following bus section for the enumerating node to enumerate the next section.

If no failures exist in the next node, the enumerating node may poll the next node for self-diagnostic data and other information. Thereafter, the enumerating node may request the next node either to disconnect from the bus or close its second bus switch in order to continue enumerating following bus sections in the same sequence as described until enumeration is completed on both sides of the enumerating node.

Through the enumeration, failures can be diagnosed, located and isolated. If a node has a failure, the failed node is identified with detailed failure causes (e.g., overcurrent, no response, shortage, etc.) and is also isolated from the bus by self-isolation. If a bus section has a failure, the failure is also identified with detailed failure causes (e.g., open circuit, short circuit, etc.) and is also isolated by terminating the tool string at the node connecting to the failed bus section. The bus section failure is isolated by sectioning the tool string into two sub-tool strings on either side of the failed bus section. Both of two new sub-tool strings are re-terminated properly at the node connecting to the failed bus section for continuous operation independently in parallel.

In response to the loss of polling, multiple nodes capable of tool string enumeration may start enumerating on the bus. In the bus mastering, bus access contention should be avoided or arbitrated. One collision avoidance method is the time delay. Each node is preloaded with different delays. Therefore, upon detecting the loss of polling, the node with the shortest delay starts enumerating first and then can disable other nodes from enumerating. Another arbitrating method is the bus voltage detection. Each node uses a power source with the voltage level different from the other nodes in the tool string. The node with a lower voltage level may stop its enumeration upon detecting another ongoing enumeration with a higher voltage level. Therefore, only the node with the highest voltage level can complete the enumeration and is elected as the new master node for a sub-tool string.

Remediation of Tool Bus Failure

In most downhole applications, only one telemetry 206 is used to link the tool string 300 to the surface 207 for real-time data or data and power communication. Although dual telemetries are gaining popular, they are used for higher bandwidth and better adaptability to various drilling conditions and are simply packaged together in a single node. Consequently, only one sub-tool string inherits the telemetry 206 and operates as before in the event of a bus failure, while the other sub-tool string enters an autonomous logging mode as real-time communication to the surface 207 is ceased.

Figure 5:
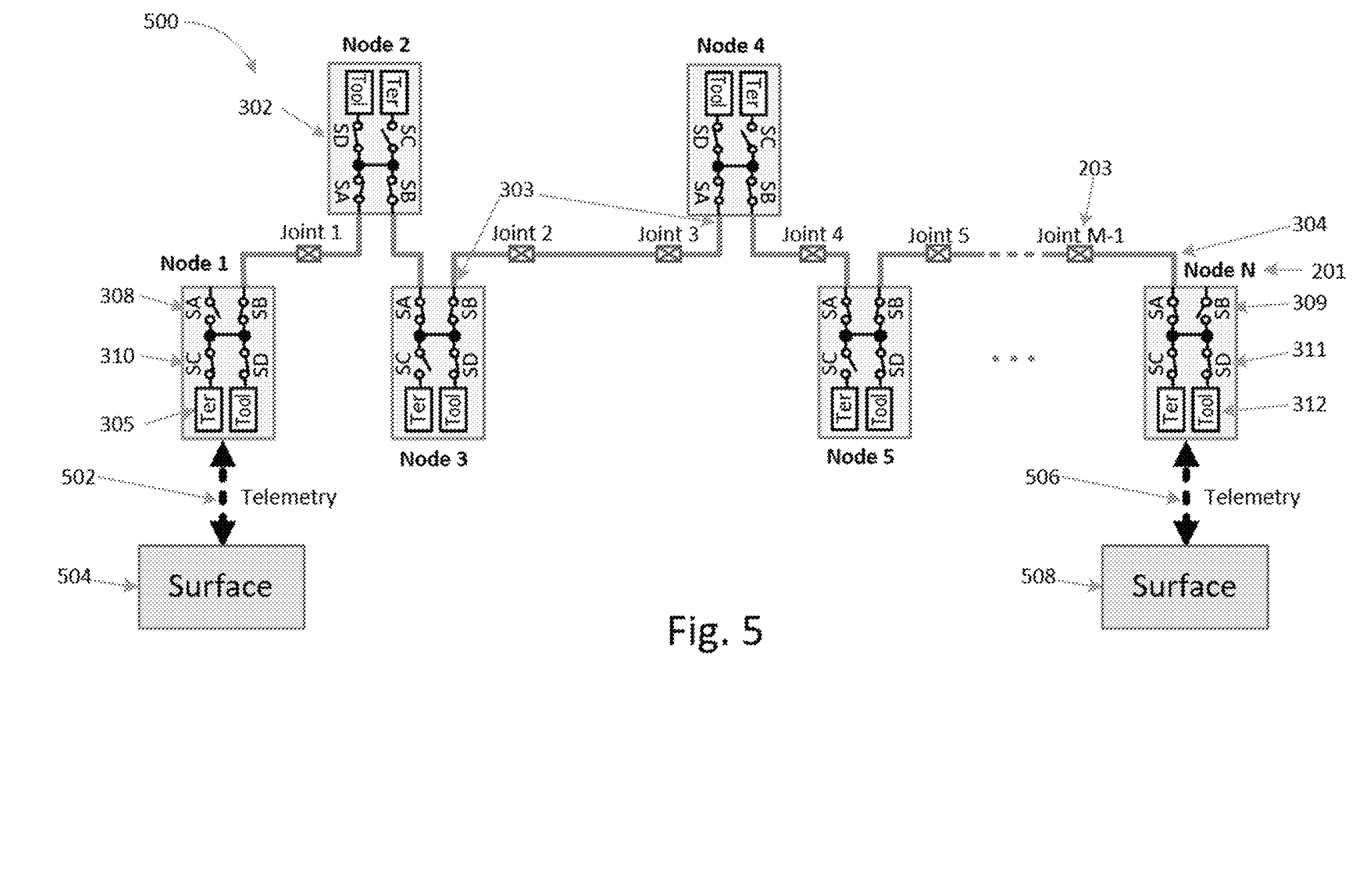
FIG. 5 is a schematic diagram of a bus communication remediation with multiple surface telemetry nodes in the event of a bus sectioning event.

FIG. 5 is a schematic diagram of a schematic diagram of a bus communication remediation with multiple surface telemetry nodes in the event of a bus sectioning event. The fault-tolerant tool string 500 may be implemented similar to the fault-tolerant tool string 300 described above, but with multiple telemetry nodes. That is, the fault-tolerant tool string 500 has two nodes with telemetry to the surface. In the example shown in FIG. 5, Node 1 has a first telemetry link 502 to a first surface communication device 504 and Node N has a second telemetry link 506 to a second surface communication device 508. In some implementations, the surface communication devices 504, 508 are the same device. Preferably, the two nodes with telemetry to the surface are connected to the two endpoint nodes of the tool string. By having telemetry on both endpoint nodes, upon experiencing a bus sectioning event, such as a bus failure or a controlled sectioning of the bus, each sub-tool string can inherit a telemetry link to the surface. Therefore, by having multiple nodes with telemetry to the surface, upon a bus sectioning event creating multiple sub-tool strings from a single unified tool string, each of the sub-tool strings may still maintain communication with the surface and resume normal operations.

In some implementations, the first telemetry link 502 may be used in normal operations and the second telemetry link 506 may be powered down or otherwise not actively communicating with the surface to save electrical power and tool lifetime. In response to a bus sectioning event, the second telemetry link 506 may establish a communication session with the second surface communication device 508 so that the sub-tool string that comprises the node with the second telemetry link 506 is still able to communicate with the surface and resume normal operations. implementations as well.

Alternatively, two or more of the intermediate nodes may have telemetry to the surface. Other configurations or combinations of multiple nodes with telemetry to the surface are contemplated by this disclosure. Therefore, each sub-tool string can maintain communication with the surface despite the occurrence of a bus failure and normal operation may continue.

The two telemetries 502, 506 may use different types of telemetry communication techniques. For example, the telemetry 506 connected to the node N may be an EM telemetry, and the telemetry 502 connected to the node 1 may be a mud-pulse telemetry. Other types of telemetry technologies may be used, such as mud pulse, acoustic wave, electromagnetic wave, wired-pipes, continuous conductors (wire line, coil tubing, slickline, etc.) or a combination thereof. Additionally, using one or more collision avoidance communication schemes, the two telemetries 502, 506 may use the same type of telemetry to the surface.

Bus failures or other bus sectioning events may also be remediated by establishing communication 414 between two sub-tool strings with wireless communication. The wireless communication between two sub-tool strings may be used in addition or as an alternative to having multiple telemetry nodes.

Figure 6:
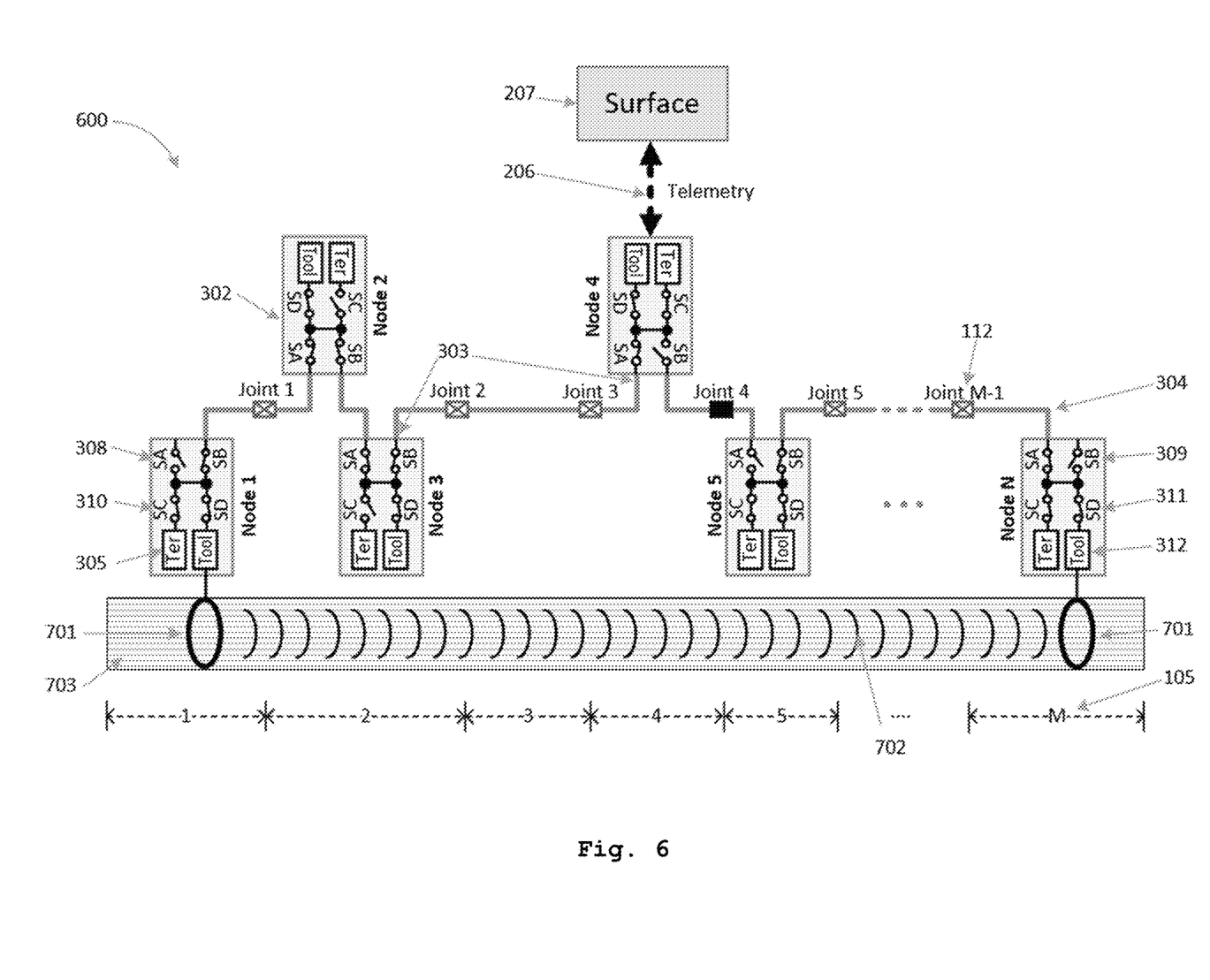
FIG. 6 is a schematic diagram of a bus communication remediation for wirelessly communicating signals in the event of a bus sectioning event.

The wireless communication can be used to remedy the loss of communication of a sub-tool string with the surface 207 due to the isolation of a bus section in response to a bus sectioning event. FIG. 6 is a schematic diagram of a bus communication remediation for wirelessly communicating signals in event of a failure in the bus 304. In the example shown in the FIG. 6, a failure (e.g., a broken joint or a short circuit) occurs at Joint 4, and causes the tool string 600 to be divided into two sub-tool strings after tool string enumerations 409 and 412. This example also shows that only node 4 has telemetry 206 to the surface 207. A first sub-tool string comprises Nodes 1-4, while a second sub-tool string comprises Nodes 5-N. To isolate the bus section comprising the failed Joint 4, Node 4 opens its bus switch SB 309 and Node 5 opens its bus switch SA 308. Meanwhile, Node 4 closes its terminator switch SC 310 to terminate the first sub-tool string at an end adjacent to the bus failure, and Node 5 closes its terminator switch SC 310 to terminate the second sub-tool string at an end adjacent to the bus failure. Thereafter, both sub-tool strings can operate separately in parallel.

A wireless communication session is established so that the second sub-tool string can communicate with the surface 207 through the first sub-tool string. In the FIG. 6, two signal transceivers 701 are installed in Segment 1 and Segment M, with one transceiver connecting to Node 1 and the other transceiver connecting to Node N. Transceivers 701 are used to transmit/receive wireless signals 702 propagating through a communication media 703 between Node 1 and Node N. Although only one transceiver 701 is shown to connect to Node 1 or Node N, there may be multiple transceivers or an array of transceivers 701 connected to a plurality of nodes in some embodiments. Further, while described herein as a transceiver 701, physically different components may be provided for use as a transmitter and a separate receiver.

Various methods may be used to establish the wireless communication between nodes. One preferred method is to use an EM wave as the wireless signal 702. To establish the EM communication between Node 1 and Node N, an antenna or array of antennas which may be circular, elliptical or in any appropriate shape is used as the transceiver 701. Different installations of the antenna(s) may be used. In one embodiment, the antenna(s) is installed around the outer perimeter of a segment 105, and thereby the communication media 703 comprises the annulus 110 and/or surrounding formation 100. In another embodiment, the antenna(s) are installed in the inner bore 109 of segments 105 which acts as the communication media 703. As segments 105, which are usually made of metal or metal alloys, block the wireless EM signal 702 from leaving the inner bore 109, the drill string 102 acts as a waveguide for the EM wave 702. Today, various EM tools have being used downhole for formation evaluation or communication. The existing tools usually make use of the annulus 110 and/or surrounding formation 100 to propagate the EM wave signal. As the types and the number of such EM tools are increasing, it becomes challenging to manage the spatial EM environment in order to avoid signal interference. With the inner bore 109 as the communicating media 703, the potential EM interference with the current tools is avoided.

Another preferred method is to use an acoustic wave as the wireless signal 702. The acoustic wave is usually generated with acoustic transceivers which may be magnetostrictive, piezoelectric or other appropriate method. Different from an EM wave, an acoustic wave can also propagate through the metal body of segments 105. Therefore, the communication media 703 may be outside the segments 105, through the segments 105, inside the segments 105, or a combination thereof.

Another preferred method is to use electric charges as the wireless signal 702. In this method, electric charges are injected into the annulus 110 and surrounding formation 100 with an electrode or array of electrodes which function as the signal transceiver 701. As the mud flowing in the annulus 110 and the surrounding formation 100 have a slight conductivity, the injected charges can propagate outwardly and finally captured by the signal transceiver 701 of the receiving node which may also comprise an electrode or array of electrodes. In this way, data information can be transmitted by varying the injection of electric charges.

In the practice, any one method or their combination may be used to establish the required wireless communication between Node 1 and Node N. Besides the transceiver 701, the tool 312 comprises of necessary functional circuits for signal generation, detection and processing required for wireless communication, such as power amplification, signal conditioning, A/D or D/A conversion, signal processing, etc., which are well-known to one of ordinary skill in the art and are outside of the scope of this disclosure.

Two endpoint nodes are preferably used to include the wireless communication functionality for the widest tool string coverage. However, in some situations, one or two intermediate nodes may be configured with wireless communication functionality as well. For example, when a particular joint is known for a high failure rate, it may be desirable for the two nodes directly adjacent to the particular joint to implement the wireless communication. By locating the wireless communication nodes adjacent to the problematic joint, the communication length is minimized to facilitate a high-speed communication or a low-power consumption communication. Multiple nodes may also include such wireless communications to create multiple wireless links, which may join in series for higher speed or higher bandwidth, or operate independently to remedy bus failures in multiple bus sections.

Wireless communication is preferably used only to remedy a bus failure, although it may operate in parallel with the bus communication. Due to signal attenuation, a wireless communication in downhole environments usually has a low power efficiency which is typically a few bits to several hundred bits per watt, and a low data throughput up to a few thousand bits per second. By the contrast, the bus communication may have a throughput of up to a few megabits at a power usage of less than one watt. Moreover, as downhole tools have limited life time of up to a few thousand hours, unnecessary operation of the wireless communications will deplete the useful tool life time and reduce their reliability. Preferably, the wireless communication is disabled by powering down the relevant electronics in normal tool bus operation, although occasional power-up for communication channel training against dynamic downhole conditions may still be executed.

Although in the disclosed embodiments described above four switches are used to achieve a universal applicability to all applications, one or two of the four switches might be spared in the specific situations without departing from the principles and methods disclosed herein. For example, in some low-speed or short tool bus systems, signal reflection without bus terminations might be insignificant, the bus terminator switch might not be used. As an additional example, in some tool bus systems, the direction of bus current is fixed and does not change in the operation. The bus switch of one node which receiving the bus current might be spared.

Although the disclosed embodiments use one tool switch to protect the tool electronics from the bus. In some cases, more tool switches may be used and connected to the same bus section. For example, for a node that comprises multiple tools, each tool may be connected to the same bus section by a separate tool switch. One of the tool switches may be elected as the primary tool switch and the rest of the tool switches are secondary tool switches. In one implementation, only the main controller unit of the tool protected by the primary tool switch is responsible for control over the bus switches in the node while the main controller units of the other tools protected by the secondary tool switches only control their own tool switches individually. In another implementation, all the secondary tool switches may also be controlled by the main controller unit of the tool protected by the primary tool switch.

Although the disclosed methods are control the tool string in response to a bus sectioning event, such as a bus failure, and mitigate the consequences of the bus sectioning event, the methods may also be used to implement advanced functions and achieve special purpose when no failure occurs. Software control can be made to reconfigure the tool string while the tool string remains downhole. For example, the tool string may be sectioned into sub-tool strings by software to achieve higher bus speed over a shorter communication length, or to isolate a sub-tool string with noisy tools from others when sensitive measurements are made, or to selectively power off some intermediate tools to save their lifetime when their functions are not used, etc. When the tool string is sectioned by software control, the resultant sub-tool strings can still communicate wireless and re-join together easily when needed.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. A method, comprising:
    detecting a failure has occurred in a bus section in a tool string used in a bottom hole assembly (BHA) positioned in a borehole; and
    in response to detecting the failure,
        isolating the bus section by disconnecting the bus section at a first node of the tool string from a first side of the bus section and disconnecting the bus section at a second node of the tool string from a second side of the bus section that is below the bus section relative to the surface of the borehole, wherein isolating the bus section creates a first sub-bus on the first side comprising the first node and a second sub-bus on the second side comprising the second node;
        operating the first sub-bus independently of the second sub-bus;
        communicating the signals from the first sub-bus to the surface of the borehole with a first telemetry; and
        communicating the signals from the second sub-bus to the surface of the borehole with a second telemetry.

2. The method of claim 1, wherein the first telemetry operates and the second telemetry is not used in normal operations without the detection of the failure.

3. The method of claim 2, wherein the second telemetry comprises wireless communications.

4. The method of claim 1, wherein operating the first sub-bus independently of the second sub-bus comprises operating the first sub-bus in parallel with operating the second sub-bus.

5. The method of claim 1, wherein operating the first sub-bus independently of the second sub-bus comprises generating bus signals associated with the first sub-bus and bus signals associated with the second sub-bus.

* * * * *